United States Patent
Yamamoto et al.

(10) Patent No.: US 10,137,541 B2
(45) Date of Patent: Nov. 27, 2018

(54) METHOD FOR MANUFACTURING BEARING RING MEMBER

(71) Applicant: NSK Ltd., Shinagawa-ku, Tokyo (JP)

(72) Inventors: Masahito Yamamoto, Fujisawa (JP); Hiroshi Koyama, Fujisawa (JP); Kazuto Kobayashi, Fujisawa (JP)

(73) Assignee: NSK Ltd., Tokyo (JP)

( * ) Notice: Subject to any disclaimer, the term of this patent is extended or adjusted under 35 U.S.C. 154(b) by 285 days.

(21) Appl. No.: 14/786,535

(22) PCT Filed: Apr. 22, 2014

(86) PCT No.: PCT/JP2014/061343
§ 371 (c)(1),
(2) Date: Oct. 22, 2015

(87) PCT Pub. No.: WO2014/175293
PCT Pub. Date: Oct. 30, 2014

(65) Prior Publication Data
US 2016/0114438 A1    Apr. 28, 2016

(30) Foreign Application Priority Data
Apr. 22, 2013  (JP) ................................. 2013-089661

(51) Int. Cl.
*B23P 15/00*  (2006.01)
*B21K 1/04*  (2006.01)
(Continued)

(52) U.S. Cl.
CPC ............. *B23P 15/003* (2013.01); *B21J 1/003* (2013.01); *B21K 1/04* (2013.01); *B21K 1/40* (2013.01);
(Continued)

(58) Field of Classification Search
CPC .......... B23P 15/003; B21J 1/003; B21K 1/04; F16C 33/62; F16C 33/64
See application file for complete search history.

(56) References Cited

U.S. PATENT DOCUMENTS

| 8,161,620 B2 | 4/2012 | Ficker et al. |
| 2008/0089631 A1 | 4/2008 | Kobayashi et al. |
| 2013/0157077 A1 | 6/2013 | Wang et al. |

FOREIGN PATENT DOCUMENTS

| GB | 2 232 726 A | 12/1990 |
| JP | 3-31425 A | 2/1991 |

(Continued)

OTHER PUBLICATIONS

International Search Report from International Patent Application No. PCT/JP2014/061343, dated Apr. 22, 2014.

*Primary Examiner* — John E Uselding
(74) *Attorney, Agent, or Firm* — Shapiro, Gabor and Rosenberger, PLLC

(57) ABSTRACT

Provided is a method for manufacturing a bearing ring member, whereby processing cost can be reduced and a high degree of freedom in design is obtained, by disposing a metal material of a raw material (13a), the metal material having excellent metal characteristics such as fatigue strength and wear resistance and excellent processing characteristics such as hardenability, in a portion that flows to a portion (raceway surface, etc.) where the characteristics of the metal material are required during use or forging of a bearing ring member. The present invention is configured from a first metal part (23) in which the raw material (13a) is formed in a cylindrical shape, and a second metal part (24) formed in a columnar shape by a metal material having more excellent metal characteristics or processing characteristics than the first metal part (23). For example, the second metal part (24) is disposed in a portion on an inside diameter side (Continued)

of the first metal part (23), which is a portion of the raw material (13*a*) that flows to an outer raceway (5*a*, 5*b*) of an outer ring (2) during forging.

9 Claims, 14 Drawing Sheets

(51) Int. Cl.
*F16C 33/62* (2006.01)
*F16C 33/64* (2006.01)
*B21J 1/00* (2006.01)
*B21K 1/40* (2006.01)
*F16C 33/58* (2006.01)

(52) U.S. Cl.
CPC ............ *F16C 33/585* (2013.01); *F16C 33/62* (2013.01); *F16C 33/64* (2013.01); *F16C 33/581* (2013.01); *F16C 2220/46* (2013.01)

(56) References Cited

FOREIGN PATENT DOCUMENTS

| | | |
|---|---|---|
| JP | 4-41111 U | 4/1992 |
| JP | 04-41111 U | 4/1992 |
| JP | 2006-95554 A | 4/2006 |
| JP | 2011-207374 A | 10/2011 |
| JP | 2012-006017 A | 1/2012 |
| JP | 2012-223798 A | 11/2012 |
| WO | WO 2012/019509 A1 | 2/2012 |

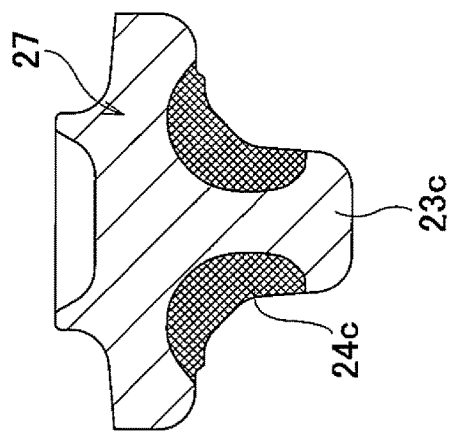
Fig.4 (A)
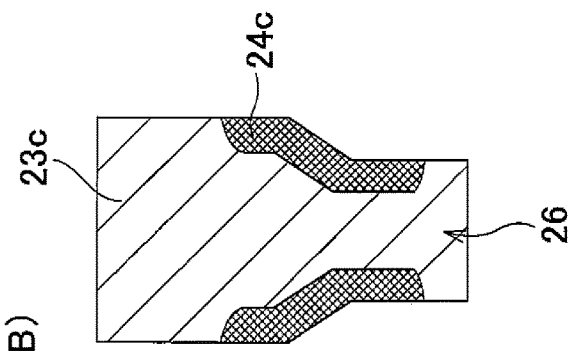
Fig.4 (B)
Fig.4 (C)
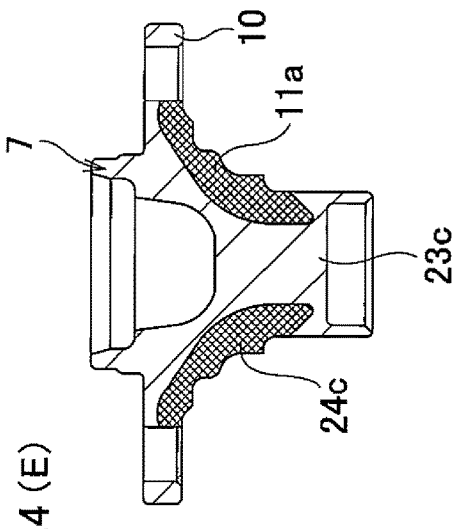
Fig.4 (E)
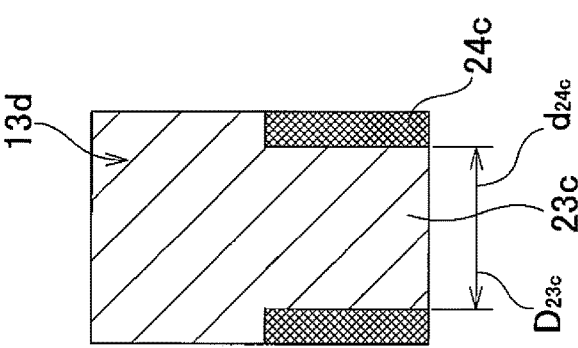
Fig.4 (D)

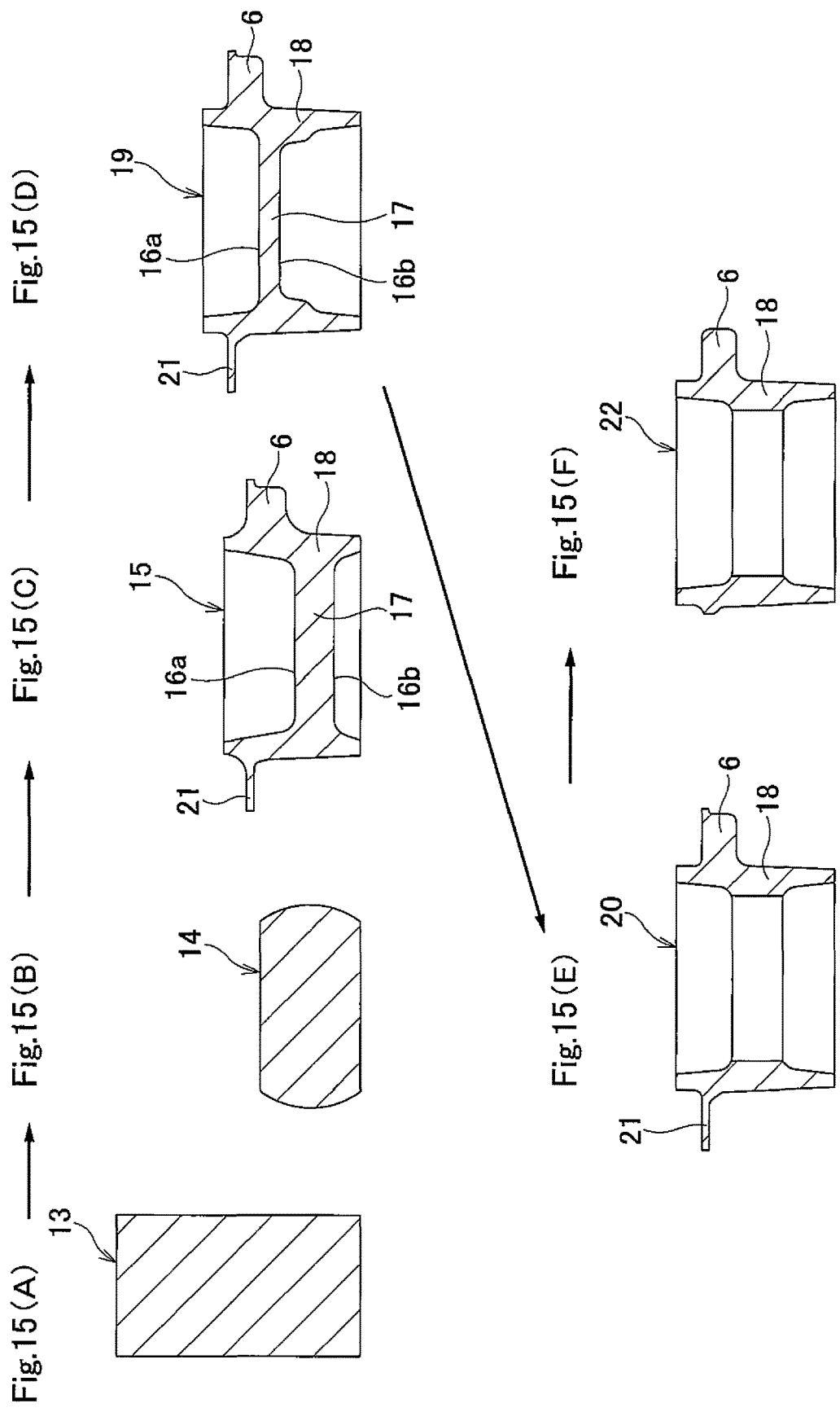

METHOD FOR MANUFACTURING BEARING RING MEMBER

TECHNICAL FIELD

The present invention relates to a method for manufacturing a bearing ring member of a rolling bearing or the like that is used by being assembled in a rotation support section of various kinds of machinery, and has a raceway surface formed completely around at least one circumferential surface.

BACKGROUND ART

Rolling bearings are assembled in the rotation support sections of various kinds of machinery including vehicles, machine tools, industrial machinery, and other general machinery. Moreover, ball screw apparatuses may also be assembled in various kinds of machinery as an axial feeding apparatus, and as members of such rolling bearings and ball screw apparatuses, there are bearing ring members that have a raceway surface formed completely around at least one circumferential surface of the inner-circumferential surface and outer circumferential surface. FIG. 14 illustrates an example of conventional construction of a rolling bearing unit for wheel support as disclosed in JP 2012-006017(A), and is a rolling bearing unit for supporting wheels of an automobile, and a rotating member for a brake such as a brake disc or the like so as to be able to rotate freely with respect to a suspension.

The rolling bearing unit for wheel support illustrated in FIG. 14 is for a driven wheel (front wheel in a FR or MR automobile, and a rear wheel in a FF automobile), an outer ring 2, a hub 3 and plural rolling bodies 4. The outer ring 2 has a double row of outer-ring raceways 5a, 5b formed at two locations in the axial direction of the inner-circumferential surface, and a stationary-side flange 6 formed in a portion near the inside end in the axial direction of the outer-circumferential surface (here, "inside" in the axial direction refers to the center side in the width direction of the vehicle when assembled in an automobile (right side in FIG. 14), and the "outside" in the axial direction refers to the outside in the width direction of the vehicle (left side in FIG. 14)). Moreover, the hub 3 is constructed by combining and fastening together a main hub unit 7 and an inner ring 8 using a nut 9, and has a rotating-side flange 10 that is formed on a portion near the outside end in the axial direction of the outer-circumferential surface of the hub 3, and double-row inner-ring raceways 11a, 11b are formed at two location in the axial direction of a portion in the middle section and a portion near the inside end in the axial direction of the outer-circumferential surface of the hub 3. Plural rolling bodies 4 are arranged in each of the double rows between the inner-ring raceways 11a, 11b and the outer-ring raceways 5a, 5b, so that the hub 3 can rotate on the inner-diameter side of the outer ring 2. In the operating state, the stationary-side flange 6 of the outer ring 2 is joined and fastened to the knuckle of a suspension apparatus, and the wheel and brake rotating member are joined and fastened to the rotating-side flange 10 of the hub 3.

The outer ring 2, main hub unit 7 and inner ring 8 of the rolling-bearing unit 1 for wheel support have a raceway surface formed around the inner-circumferential surface or outer-circumferential surface thereof, and correspond to a bearing ring member. This kind of bearing ring member is made by forging a metal raw material, and then performing finishing processing such as a machining and polishing. As an example of a conventional manufacturing method for a bearing ring member is a manufacturing method for an outer ring 2 as disclosed in JP 2012-006017 (A), which will be explained with reference to FIG. 15A to FIG. 15F.

In order to manufacture the outer ring 2, first, as illustrated in FIG. 15A, a metal circular column shaped raw material 13 is used. The size of the raw material 13, depending on the type of bearing ring member to be manufactured, is normally such that a ratio of the diameter and length in the axial direction is about 5:4 to 5:6. In the first upsetting process, the upset intermediate material 14 is obtained by crushing the raw material 13 in the axial direction as illustrated in FIG. 15B. The upset intermediate material 14 is such that the outer diameter of the middle section in the axial direction becomes larger than the outer diameter of both end sections in the axial direction, so as to have a beer barrel shape or thick disk shape. The length in the axial direction of a beer barrel shaped upset intermediate material 14 is about 40% to 70% the length in the axial direction of the raw material 13, and the length in the axial direction of a thick disk shaped upset intermediate material is about 30% to 35% the length in the axial direction of the raw material 13.

Next, in a preforming process, the perimeter of the upset intermediate material 14 is surrounded by preforming die, and the upset intermediate material 14 is plastically deformed by pressing the center section of both end sections in the axial direction of the upset intermediate material 14 with a preforming pressure punch. Then, a preformed intermediate material 15 as illustrated in FIG. 15C is obtained. The preformed intermediate material 15 has a pair of open concave sections 16a, 16b on both end surfaces in the axial direction of the preformed intermediate material 15, a partition section 17 that is located between the bottom sections of the concave sections 16a, 16b, and a stationary-side flange 6 that is formed so as to protrude outward in the radial direction at a position near one side in the axial direction of the outer circumferential surface (top side in FIG. 15C). The thickness in the axial direction of the partition section 17 of the preformed intermediate material 15 is about 15% to 30% the length in the axial direction of the upset intermediate material 14, and the thickness in the radial direction of the cylindrical portion 18 of the preformed intermediate material 15 is about 15% to 25% the diameter of the upset intermediate material 14.

Next, in the finish-formation process, a finish-formation die is placed around the preformed intermediate material 15, and in this state, a pair of finish-formation pressure punches press both end surfaces in the axial direction of the preformed intermediate material 15. As a result, the partition section 17 is crushed in a direction such that the thickness dimension is reduced, and the shape of the cylindrical portion 18 that is located around the partition section 17 approaches the shape of the outer ring 2. Then, the finish-formed intermediate material 19 illustrated in FIG. 15D is obtained. The thickness in the axial direction of the partition section 17 of the finish-formed intermediate material 19 is about 10% to 20% the length in the axial direction of the upset intermediate material 14, and the thickness in the radial direction of the cylindrical portion 18 of the finish-formed intermediate material 19 is about 10% to 20% the diameter of the upset intermediate material 14.

Furthermore, in the punching process, by punching and removing the partition section 17 of the finish-formed intermediate material 19 except the portion around the outer perimeter edge, a punched intermediate material 20 as illustrated in FIG. 15E is obtained. Finally, in a deburring process, by removing burrs 21 that remain on the outer perimeter edge section of the stationary-side flange 6 of the punched intermediate material 20, a final intermediate material 22 as illustrated in FIG. 15F is obtained. After that, a finishing process such as machining and polishing is performed on each part of the final intermediate material 22, to complete the outer ring 2 illustrated in FIG. 14.

Incidentally, the column shaped raw material 13 illustrated in FIG. 15A is obtained by cutting a long member that was extrusion molded by a steel manufacturer, having a circular cross section with respect to a virtual plane that runs in the axial direction, and it has been conventionally known that the composition (cleanliness) of the raw material 13 is not uniform. Moreover, it is known that when the metal portion of the raw material 13 having a large amount of oxide-based non-metallic inclusions and low cleanliness is exposed to the portion of the double-row outer-ring raceways 5a, 5b that are formed around the inner-circumferential surface of the outer ring 2, and particularly the portion that comes in contact with the rolling surfaces of the rolling bodies 4, it becomes difficult to maintain the rolling fatigue life of that portion.

In the manufacturing method disclosed in JP 2010-006017 (A), the forging process is designed so that a portion where the amount of oxide-based non-metallic inclusions is small and the level of cleanliness is high that exists within a range of 50% to 70% the radius from the center of the raw material 13 can be located in the outer-ring raceways 5a, 5b of the outer ring 2. As a result, it is possible to manufacture at low cost an outer ring 2 for which the rolling fatigue of the outer-ring raceways 5a, 5b can be sufficiently maintained. However, in order to cause the portion of the raw material 13 having a high degree of cleanliness to flow in the outer-ring raceways of the outer ring during the forging process, there is a possibility that the forging process, and the construction of the outer ring to be manufactured, for example, the outer-ring raceways or the position of the stationary-side flange will be limited, and thus the freedom of design will be limited. In other words, when manufacturing the raw material, the portion having a high level of cleanliness is regularly in nearly the same position, so in order for the forging process to cause the portion having a high level of cleanliness to flow to the raceway surface, the forging process, the shape of the bearing ring member and the like are restricted.

Moreover, as a main cause for reducing the rolling fatigue life of the raceway surfaces of the bearing ring member, in addition to the cleanliness of the raw material, there is the hardness and toughness of the metal material of the raw material. In case of forming the raceway surfaces of the bearing ring member, such characteristics affect the fatigue strength and wear resistance of the raceway surfaces. Therefore, as the raw material, using a simple metal material such as high carbon chromium bearing steel (SUJ2 to SUJ5) or the like having excellent fatigue strength and wear resistance has been considered for forming the raceway surfaces, however, this kind of metal material is very expensive when compared with steel for machine structures, so using this material for the entire bearing ring member would cause an increase in the material cost of the bearing ring member. Moreover, metal material such as high carbon chromium bearing steel has higher hardness and lower machinability when compared with steel for machine structures, so there is also the possibility of high processing costs for machining that is performed after forging.

RELATED LITERATURE

Patent Literature

[Patent Literature 1] JP 2012-006017 (A)

SUMMARY OF INVENTION

Problem to be Solved by Invention

Taking the above situation into consideration, the object of the present invention is to provide a low-cost manufacturing method by forging that is capable of manufacturing a bearing ring member having excellent fatigue strength and wear resistance of the raceway surface thereof, while at the same time maintaining freedom of design.

Means for Solving Problems

The bearing ring member that is the object of the manufacturing method for a bearing ring member of the present invention is obtained by performing a forging process (hot forging, cold forging, or warm forging) on a metal material as a raw material, and a raceway surface is formed all around at least one circumferential surface of the outer-circumferential surface and inner-circumferential surface. In other words, the manufacturing method for a bearing ring member of the present invention has a step of preparing at least a metal material, and a step of obtaining a bearing ring member by performing a forging process on the metal material.

In the present invention, the metal material has: a first metal part, and a second metal part that is made by using a different metal material than the first metal part, or made by performing a modifying process on the same kind of material as the first metal part. In other words, the metal material of the present invention has at least two metal parts that have different metal characteristics. The second metal part is provided only in a portion of the metal material which flows to a portion of the bearing ring member where the characteristics of the metal material of the second metal part are required when using or processing the bearing ring member. The position where the second metal part is located is appropriately determined by knowing what portion of the metal material corresponds to a portion of the bearing ring member that requires excellent processing characteristics during processing thereof, or a portion that corresponds to the raceway surface of the bearing ring member that is finally obtained. This kind of metal material is prepared and provided for the forging process according to the appearance and shape of the bearing ring member that is finally obtained.

Preferably, the second metal material is made so that the fatigue strength and wear resistance in case of constituting the raceway surface is higher than that of the first metal part, and is provided only in a portion of the metal material where the raceway surface is formed and a vicinity thereof where the second metal material flows due to the forging process. Alternatively, the second metal material can be made so that the corrosion resistance in use of the baring ring member is higher than that of the first metal part. Furthermore, the second metal part can be made so that the hardenability or machinability during processing of the metal material is better than that of the first metal part. The metal material can be made using two metal parts that comprise different metal characteristics, and also the metal material can be made using three or more metal parts having different metal characteristics, for example, by making the first metal part using plural kinds of metals instead of using only one kind of metal (steel for machine structures, case hardened steel including SCM420, and the like) that has the same characteristics for the entire part or partially different characteristics.

Preferably, the metal material is made into a column shape or cylindrical shape. The first metal part and second metal part are fitted together by a pressure fit or the like, and arranged in an overlapping state in the radial direction.

More specifically, in case that the raceway surface is an outer-ring raceway that is formed around the inner circumferential surface of the bearing ring member, the first metal part is formed into a cylindrical shape, the second metal part is formed into a column shape or cylindrical shape, and the second metal part is provided on the inside of the first metal part.

In case that the raceway surface is an inner-ring raceway that is formed around the outer-circumferential surface of the bearing ring member, the first metal part is formed into a column shape or cylindrical shape, the second metal part is formed into a cylindrical shape, and the second metal part is provided on the outside of the first metal part.

When the raceway surfaces are both an inner-ring raceway that is formed around the outer-circumferential surface of the bearing ring member, and an outer-ring raceway that is formed around the inner-circumferential surface of the bearing ring member, the first metal part is formed into a cylindrical shape, the second metal part has a column shaped or cylindrical shaped second small-diameter metal part and a cylindrical shaped second large-diameter metal part, the second small-diameter metal part is provided on the inside of the first metal part, and the second large-diameter metal part is provided on the outside of the first metal part.

By using one kind of metal for the metal material and performing a modifying process on part of that metal material to form the second metal part, the boundary between the first metal part and the second metal part is not always along a straight line. Therefore, that the shape of the first metal part or second metal part is a column shape or a cylindrical shape, also includes the cases in which the shape is a rough column shape or rough cylindrical shape.

Effect of Invention

With the present invention, it is possible to manufacture at low cost with a forging process, a bearing ring member having a raceway surface that has excellent fatigue strength and wear resistance, while at the same time maintain freedom of design. Alternatively, it is possible to manufacture at low cost a bearing ring member that is selectively given corrosion resistance in portions that require measures against corrosion in use of the bearing ring member. Furthermore, it becomes possible to keep down manufacturing costs for a bearing ring member by making it possible to selectively place metal material having excellent processing characteristics such as hardenability and machinability in portions that particularly require processing during processing of the bearing ring member. In other words, the metal material of the present invention has a first metal part, and a second metal part that has better metal characteristics (fatigue strength, wear resistance, corrosion resistance and the like), or better processing characteristics (hardenability, machinability, and the like) than the first metal part. The second metal part is provided only in the portion of the metal material which flows due to the forging process to the portion of the bearing ring member where the characteristics described above of the metal material of the second metal part are required such as the raceway surface and a vicinity thereof. Therefore, the amount of the second metal part which is more costly than the first metal part can be suppressed by the amount that is necessary in order to maintain the metal characteristics such as the durability of the raceway surface, or to maintain the processing characteristics. As a result, it is possible to keep down the material costs or processing costs of the metal material, and thus it becomes possible to provide at low cost a bearing ring member having excellent durability or processing characteristics.

Moreover, with the present invention, the second metal part is given excellent metal characteristics, for example, so even when the processing characteristics of the second metal part become inferior to the first metal part, or the second metal part is given excellent processing characteristics, so even when the metal characteristics of the second metal part becomes inferior to the first metal part, the second metal material is limitedly located to only part of the metal material, so when compared to the case in which the entire metal material has the same metal material as the second metal part, it is possible to suppress problems due to the application of that metal material. Furthermore, the position of the second metal part of the metal material can be appropriately determined according to the shape of the bearing ring member to be processed, and particularly the position of the raceway surface and the method of the forcing process performed, so it is possible to provide a bearing ring member at low cost for which it is possible to maintain freedom of design while maintaining the metal characteristics and processing characteristics that are required when using or processing the bearing ring member.

BRIEF DESCRIPTION OF DRAWINGS

FIG. 4A to FIG. 4E illustrate a fourth example of an embodiment of the present invention with part of the processing steps during forging omitted, and are cross-sectional views from the raw material to the completed hub.

FIG. 15A to FIG. 15F illustrate the processing order of an example of a convention manufacturing method for a bearing ring member, and are cross-sectional views from the raw material to the final intermediate material.

MODES FOR CARRYING OUT INVENTION

The present invention is a manufacturing method for a bearing ring member that obtains a bearing ring member having a raceway surface formed entirely around at least one circumferential surface of the outer-circumferential surface and inner-circumferential surface by performing a forging process on a metal material, and for example, the construction of the metal material, which is the raw material, is devised in accordance to the forging process and construction of the bearing ring member being manufactured so that metal material having high fatigue strength and high wear resistance is located only on the raceway surface(s) and the vicinity thereof of the bearing ring member. The present invention can be applied in cases where, during use, corrosion resistance is selectively given to parts of the bearing ring member, or during processing, processing characteristics such as hardenability and machinability are selectively given to part of the bearing ring member. Moreover, processing in the manufacturing method of the present invention is not limited to the processing explained in each of the examples of embodiments below. Furthermore, the manufacturing method of the examples explained below has processes that are nearly the same as in the conventional manufacturing method for a bearing ring member illustrated in FIG. 15. Therefore, in regard to parts that are the same as in the conventional method, a detailed explained will be either omitted or simplified, and the explanation below will center on the features of the present invention. The shapes and sizes (percentage occupied) by the first metal part and the second metal part of the material illustrated in the figures do not necessarily coincide with the actual shapes and sizes, and are schematically represented in order to simplify understanding of the invention.

First Example

Figure 14:
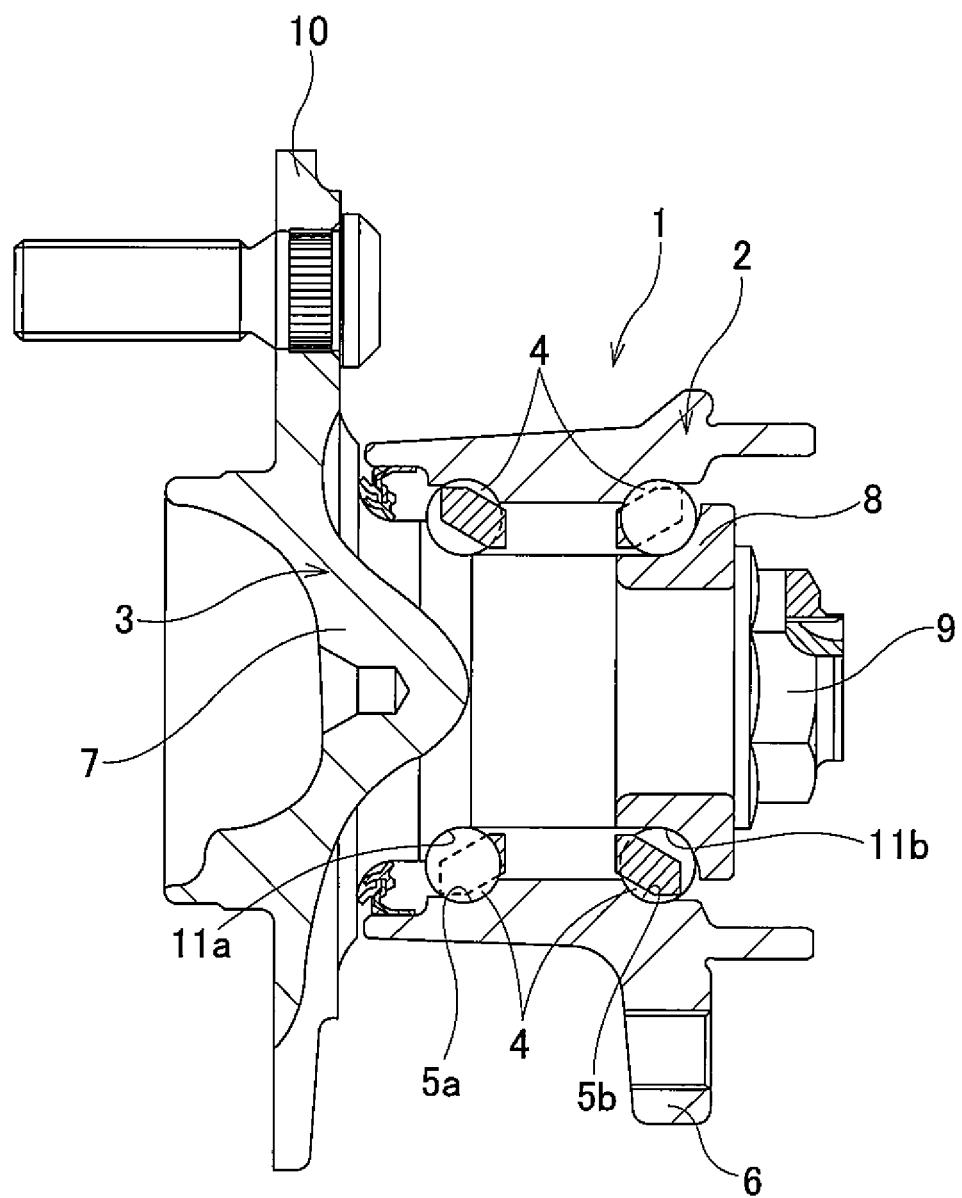
FIG. 14 is a cross-sectional view of an example of a rolling-bearing unit for wheel support for driven wheels, and has: an outer ring, which is a bearing ring member that is the object of the manufacturing method of the present invention, a hub, and an inner ring.

FIG. 1A to FIG. 1F illustrate a first example of an embodiment of the present invention. The object of the manufacturing method for a bearing ring member of this example is the outer ring 2 of a rolling-bearing unit 1 for wheel support (see FIG. 14), however, in addition to that, various kinds of bearing ring members that have raceway surfaces formed around the inner-circumferential surface thereof such as the outer ring of various kinds of radial rolling bearings, or a ball nut of a ball screw, all are the object of this example.

Figure 1:
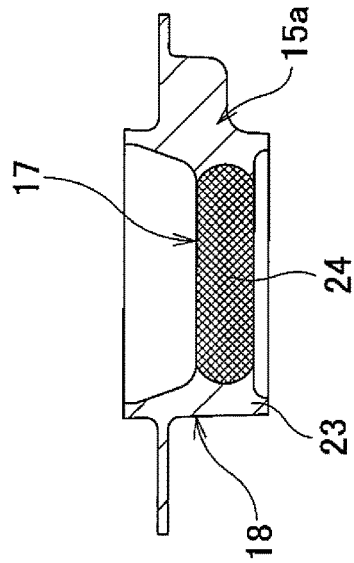
FIG. 1A to FIG. 1F illustrate the processing order of a first example of an embodiment of the present invention, and are cross-sectional views from the raw material to the complete outer ring.
Figure 1:
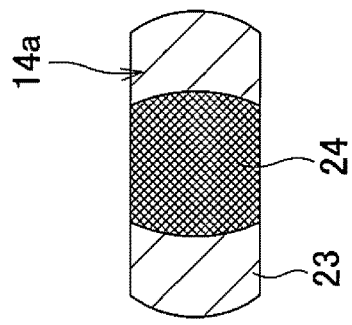
Figure 1:
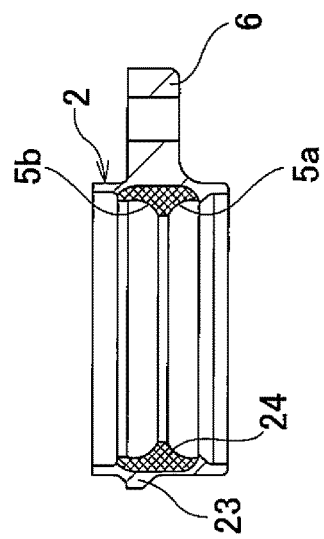
Figure 1:
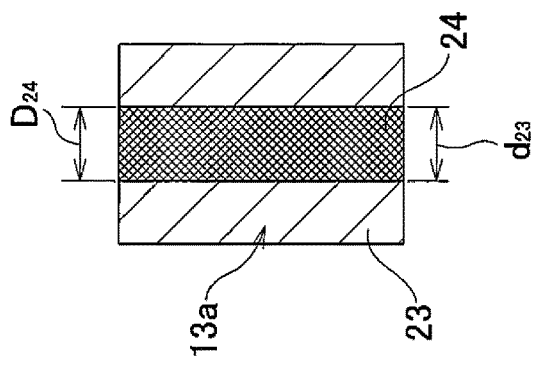
Figure 1:
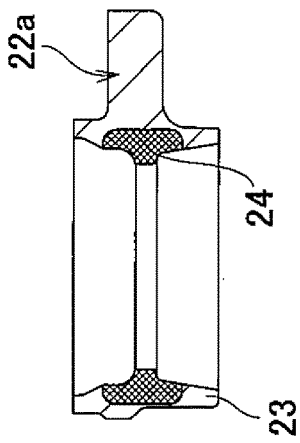
Figure 1:
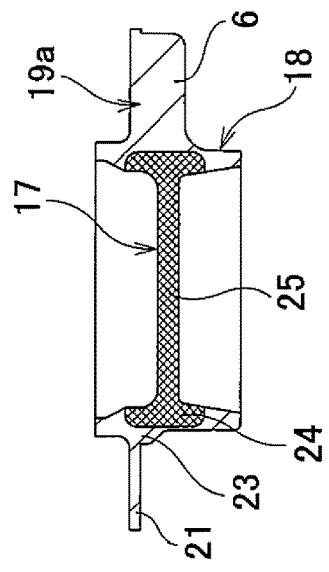

In the manufacturing method of this example, first, a metal circular column shaped raw material such as illustrated in FIG. 1A is prepared. In this example, the raw material 13a has a first metal part 23 and a second metal part 24 that is indicated by the cross-hatching in FIG. 1. The first metal part 23 is formed into a cylindrical shape using a metal material such as steel for machine structures, or case hardened steel such as SCM420 or the like. The second metal part 24 is formed into a circular column shape using a metal material such as high-carbon chromium bearing steel 2 (SUJ2) that has a higher fatigue strength and wear resistance when forming outer-ring raceways 5a, 5b of the outer ring 2 than the first metal part. However, the metal material that is used for the first metal part and the second metal part can be appropriately selected from known metal materials that can be used for a bearing ring member according to characteristics required for portions of a bearing ring member such as an outer ring 2 where the second metal part flows. The outer diameter $D_{24}$ of the second metal part is about the same as the inner diameter $d_{23}$ of the first metal part. In addition to being able to use various kinds of high-carbon chromium bearing steel (SUJ2 to SUJ5) as the metal of the second metal part, it is also possible, from the aspect of durability and manufacturing cost, to appropriately use metal material having higher fatigue strength and wear resistance when forming raceway surfaces than the metal material of the first metal part. The size of the raw material 13 depends on the type of the bearing ring member, however, normally the ratio between the diameter and length in the axial direction are about 5:4 to 5:6.

More specifically, the raw material 13a is formed by pressure fitting the metal material of the second metal part 24 with the inner-circumferential surface of the metal material of the first metal part 23. In this example, preferably the processing characteristics of the metal of the first metal part 23 and the metal of the second metal part 24 are similar to each other. As a result, it is possible to improve the stability of the structure after the forging process, and the machinability during the machining process. Moreover, in this example, the position where the second metal part 24 is located is determined, as will be described later, by knowing what portion of the raw material 13a corresponds to a portion of the outer ring 2 which corresponds to the outer-ring raceways 5a, 5b; however, in this example, the second metal part 24 is made to be present in a range of about 40% of the radius from the center of the raw material 13a, and preferably in a range of about 30% of the radius from the center of the raw material 13a. When the outer diameter of the second metal part 24 is less than 30% of the radius from the center of the raw material 13a, there is a possibility that in the outer ring 2 that is finally obtained, the metal of the first metal part 23 will flow to the outer-ring raceways 5a, 5b and the vicinities thereof. On the other hand, when the outer diameter of the second metal part 24 is greater than 40% the radius from the center of the raw material 13a, a problem occurs from the aspect of manufacturing cost in that the ratio with respect to the overall amount of metal of the second metal part 24 becomes too large.

In this example, as illustrated from FIG. 1A to FIG. 1B, a beer barrel shaped upset intermediate material 14a is obtained by using the raw material 13a and performing an upsetting process in the same way as in the conventional manufacturing method. The length in the axial direction of the beer barrel shaped upset intermediate material 14a is presumed to be 40% to 70% of the length in the axial direction of the raw material 13a. Next, as illustrated in FIG. 1B to FIG. 1C, in a preforming process, the upset intermediate material 14a is plastically deformed to obtain a preformed intermediate material 15a. The thickness in the axial direction of the partition section 17 of the preformed intermediate material 15a is taken to be 20% to 45% of the length in the axial direction of the upset intermediate material 14a, and the thickness in the radial direction of the cylindrical shaped portion 18 of the preformed intermediate material 15a is taken to be 15% to 25% of the diameter of the upset intermediate material 14a.

Next, as illustrated in FIG. 1C to FIG. 1D, in the finish-formation process the preformed intermediate material 15a is formed into the finish-formed intermediate material 19a. The thickness in the axial direction of the partition section 17 of the finish-formed intermediate material 19a is taken to be 5% to 15% of the length in the axial direction of the upset intermediate material 14a, and the thickness in the radial direction of the cylindrical shaped portion 18 of the finish-formed intermediate material 19a is taken to be 5% to 15% of the diameter of the upset intermediate material 14a. Furthermore, as illustrated in FIG. 1D to FIG. 1E, in a punching process and a deburring process, by punching and removing a partition section 25 of the finish-formed intermediate material 19a except for the outer perimeter portion thereof, and by removing burrs 21 that remain on the outer perimeter section of the stationary-side flange 6 of the finish-formed intermediate material 19a, the final intermediate material 22a is obtained. After that, as illustrated in FIG. 1E and FIG. 1F, by performing a finishing process such as machining and polishing using a lathe or the like, and a heat treatment process on the final intermediate material 22a, finally the outer ring 2 is obtained. In each of the processes of the forging process in this example, the second metal part 24 flows in states such as indicated by the cross hatching in FIG. 1A to FIG. 1F.

With the manufacturing method of this example, when outer-ring raceways 5a, 5b are formed, it is possible to cause the second metal part 24 of the raw material 13a that has better fatigue strength and wear resistance than the first metal part 23 to flow to the outer-ring raceways 5a, 5b of the outer ring 2 and the vicinities thereof. In other words, for an outer ring having construction such as illustrated in FIG. 1F, when performing a forging process such as illustrated in FIG. 1a to FIG. 1D on the column shaped raw material 13a, as long as the processing condition are constant, the metal material of the raw material 13a moves with constant regularity, and the shape becomes as the finish-formed intermediate material 19a illustrated in FIG. 1D. Therefore, all of the parts of the raw material 13a and all of the parts of the finish-formed intermediate material 19a have nearly a 1-to-1 correspondence before and after the flow. By knowing the correlation between before and after this kind of flow, it is possible to know or predict what portion of the raw material 13a corresponds to a portion of the finish-formed intermediate material 19a that corresponds to the outer-ring raceways 5a, 5b of the outer ring 2. The position where the second metal part is provided is set based on this kind of analysis.

According to this example, it is possible to obtain at low cost and by a forging process an outer ring 2 having outer-ring raceways 5a, 5b that have excellent fatigue strength and wear resistance while maintaining the freedom of design. In other words, in this example, the raw material 13a has a first metal part 23, and a second metal part 24 having higher fatigue strength and wear resistance when forming outer-ring raceways 5a, 5b than those of the first metal part 23. The second metal part 24 is provided only in the portion of the raw material 13a that is to flow to the outer-ring raceways 5a, 5b and the vicinities thereof due to the forging process. Therefore, together with being able to improve the durability of the outer-ring raceways 5a, 5b of the outer ring 2, it is possible to suppress the amount of metal material used for forming the second metal part 24 that is more expensive than that used for the first metal part 23 to just the amount necessary to maintain the durability of the outer-ring raceways 5a, 5b. As a result, it becomes possible to suppress the material cost of the raw material 13a, and to provide an outer ring 2 that has excellent durability.

Moreover, in the case of this example, the second metal part 24, which is a metal material having lower machinability than the first metal part 23, is provided only in part of the raw material 13a. Therefore, when compared with the case in which the entire raw material is constructed by the same high carbon chromium bearing steel 2 (SUJ2) as the second metal part 24, it is possible to improve the machinability. In other words, when the entire raw material is constructed by high carbon chromium bearing steel 2, the machinability worsens and the processing time becomes long when machining the outer-circumferential surface of the inside end section in the axial direction of the outer ring 2, and the side surfaces of the stationary-side flange 6, and machine tools are damaged quickly, however, in this example, those portions are made using carbon steel for machine structures that has excellent machinability, so it is possible to avoid the problem described above. As a result, it becomes possible to reduce the machining cost, and thus it is possible to reduce the manufacturing cost of the outer ring 2.

Furthermore, in the case of this example, the position in the raw material 13 where the second metal part 24 is provided, and all the dimensions are set in accordance to the forging process illustrated in FIG. 1A to FIG. 1D, or the structure of the outer ring 2 (position of the outer-ring raceways 5a, 5b). Therefore, by simply devising the construction of the raw material, it is possible to apply this example to a forging process having various processes, or to the manufacturing of bearing ring members having various kinds of construction. As a result, it becomes possible to provide at low cost an outer ring comprising outer-ring raceways 5a, 5b having excellent fatigue strength and wear resistance, while at the same time maintaining the freedom of design.

Second Example

Figure 2:
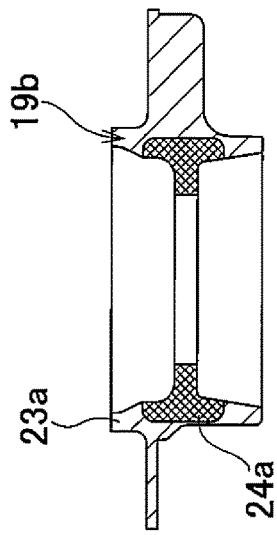
FIG. 2A to FIG. 2D illustrate a second example of an embodiment of the present invention with part of the processing steps during forging omitted, and are cross-sectional views from the raw material to the completed outer ring.
Figure 2:
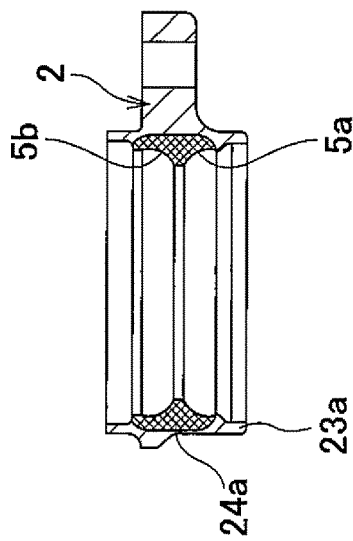
Figure 2:
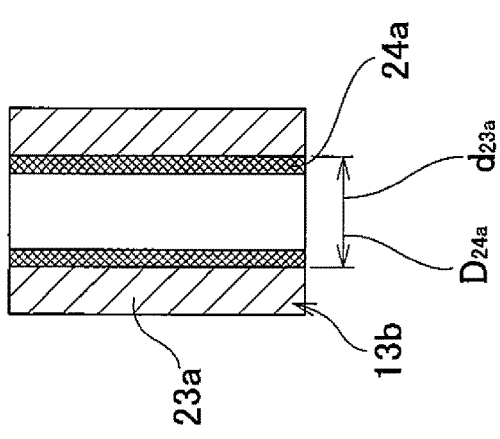
Figure 2:
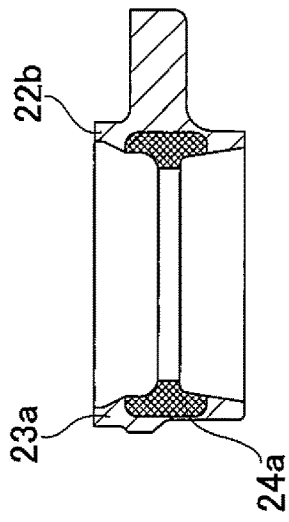

FIG. 2A to FIG. 2D illustrate a second example of an embodiment of the present invention. In this example as well, as in the first example of an embodiment, the object is the outer ring 2 of a rolling-bearing unit 1 for wheel support (refer to FIG. 14). In this example, a metal cylindrical shaped raw material 13b is prepared as illustrated in FIG. 2A. The raw material 13b has a first metal part 23a, and a second metal part 24a that is indicated by cross-hatching in FIG. 2. The first metal part 23a is formed into a cylindrical shape using a metal material comprising steel for machine structures or case hardened steel such as SCM420. The second metal part 24a is formed into a cylindrical shape using a metal comprising high carbon chromium bearing steel 2 (SUJ2) having higher fatigue strength and wear resistance when forming the outer ring raceways 5a, 5b than the first metal part 23a. The outer diameter dimension $D_{24}$, of the cylindrical shaped metal material of the second metal part 24a is nearly the same as the inner diameter dimension $d_{23a}$ of the cylindrical shaped metal material of the first metal part 23a. In this example as well, the raw material 13b is formed by pressure fitting the metal material of the second metal part 24a with the inner-circumferential surface of the metal material of the first metal part 23a. In this example, the position where the second metal part is located is determined by knowing what portion of the raw material 13b corresponds to the portion of the outer ring 2 that corresponds to the outer-ring raceways 5a, 5b, and for example, in this example, the inner diameter of the raw material 13b is taken to be about 20% to 40%, and preferably 25% to 35% of the diameter of the raw material 13b, and the first metal part is located in the portion near the outer end in the radial direction of the raw material 13b, or in other words, in the portion up to about 60% to 70% of the thickness in the radial direction from the outer-circumferential surface of the raw material 13b, and preferably in the portion up to about ⅔ of the thickness in the radial direction from the outer-circumferential surface of the raw material 13b. In other words, the second metal part is located in the portion near the inner end in the radial direction of the raw material 13b, or in other words, in the portion up to about 30% to 40% of the thickness in the radial direction from the inner-circumferential surface of the raw material 13b, and preferably in the portion up to about ⅓ of the thickness in the radial direction from the inner-circumferential surface of the raw material 13b.

The manufacturing method of this example, as illustrated in FIG. 2A and FIG. 2B, by way of an upsetting process, preforming process and finish-formation process (omitted in the figures), forms the raw material 13b into a finish-formed intermediate material 19b as illustrated in FIG. 2B. When performing the forging process in heat, it is possible to omit the preforming process. These processes can be appropriately determined according to the processing conditions. In this example as well, even though not illustrated in the figures, a beer barrel shaped upset intermediate material having a length in the axial direction that is 40% to 70% of the length in the axial direction of the raw material 13b is obtained. Moreover, the thickness in the axial direction of the partition section 17 of the finish-formed intermediate material 19b is taken to be 5% to 15% of the length in the axial direction of the upset intermediate material (omitted in the figures), and the thickness in the radial direction of the cylindrical shaped portion 18 of the finish-formed intermediate material 19b is taken to be 5% to 15% of the diameter of the upset intermediate material (omitted in the figures). Then, by way of a punching process and deburring process, the finish-formed intermediate material 19b is formed into the final intermediate material 22b such as illustrated in FIG. 2C. After that, the outer ring 2 illustrated in FIG. 2D is completed by performing finishing, such as machining and polishing using a lathe, and heat treatment of all of the parts of the final intermediate material 22b. In this example, in each of the processes in the forging process, the second metal part 24a flows in a state such as illustrated by the cross hatching in FIG. 2A to FIG. 2D. The construction, functions and effects of the other portions are the same as in the first example of an embodiment.

Third Example

Figure 3:
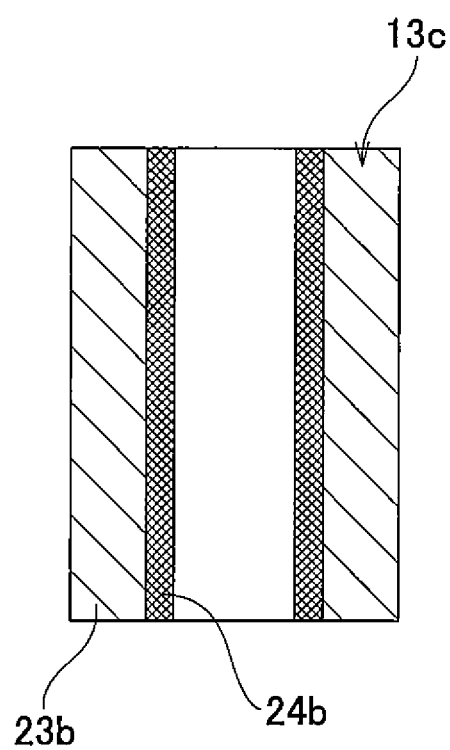
FIG. 3 is a cross-sectional view of the raw material that is used in a third example of an embodiment of the present invention.

FIG. 3 illustrates a third example of an embodiment of the present invention. In this example as well, as in the case of the first example of an embodiment, the object is the outer ring 2 of a rolling-bearing unit 1 for wheel support (refer to FIG. 14). In this example, a metal cylindrical shaped raw material 13c is prepared. The raw material 13c is constructed by one kind of metal material such as steel for machine structures or high carbon chromium bearing steel. The cylindrical shaped portion of the raw material 13c that is near the outside in the radial direction, in other words, the portion up to approximately 60% to 70% of the thickness in the radial direction from the outer-circumferential surface of the raw material 13c, and preferably the portion up to approximately ⅔ of the thickness in the radial direction from the outer-circumferential surface of the raw material 13c is taken to be a first metal part 23b. Moreover, the cylindrical shaped portion of the raw material 13c that is near the inside in the radial direction indicated by the cross hatching in FIG. 3, or in other words, the portion up to approximately 30% to 40% of the thickness in the radial direction from the inner-circumferential surface, and preferably the portion up to approximately ⅓ of the thickness in the radial direction from the inner-circumferential surface of the raw material 13c is taken to be a second metal part 24b. In this example, in order to obtain the raw material 13c, the second metal part 24b is formed by performing surface heat treatment (modifying treatment) such as carburizing treatment, carbonitriding treatment, induction hardening or the like on only the portion of the raw material 13c that corresponds to the second metal part 24b.

In the case of this example, in the state of the raw material 13c, surface heat treatment (modifying treatment) such as carburizing treatment, carbonitriding treatment or the like is performed on the portion that corresponds to the second metal part 24b. Therefore, it is possible to predict the amount of decarburization that occurs due to hot forming, and to adjust the carbon content in the second metal part 24b. As a result, in the machining process that is performed after the forging process, it is possible to reduce the material cost by reducing the machining allowance for removing the decarburized layer. Moreover, only the second metal part 24b for which the surface heat treatment (modifying treatment) such as carburizing treatment, carbonitriding treatment or the like is performed is allowed to flow into the outer-ring raceways 5a, 5b of the outer ring 2 or the vicinities thereof, so it is possible to improve the hardenability of that portion. The construction, functions and effects of the other portions are the same as in the second example of an embodiment.

Fourth Example

FIG. 4A to FIG. 4E illustrate a fourth example of an embodiment of the present invention. In this example, the object is a main hub unit 7 of rolling-bearing 1 for wheel support (refer to FIG. 14) having conventional construction. In addition to the main hub unit 7, the object of the manufacturing method for a bearing ring member of this example, also includes all kinds of bearing ring members that have a raceway surface formed around the outer-circumferential surface thereof, such as an inner ring of various kinds of radial rolling bearings, a screw shaft of a ball screw and the like.

In this example, a metal column shaped raw material 13d is prepared. The raw material 13d has a first metal part 23c, and a second metal part 24c that is indicated by cross-hatching in FIG. 4. The first metal part 23c is made using a metal material comprising steel for machine structures, or case hardened steel such as SCM420, and is formed into a stepped column shape comprising an upper-half section having a large diameter, and a lower-half section having a smaller diameter than the upper-half section.

The second metal part 24c is made using a metal material comprising high carbon chromium bearing steel 2 (SUJ2) having higher fatigue strength and wear resistance when forming an inner-ring raceway 11a than the first metal part 23c, and is formed into a cylindrical shape having an outer-diameter dimension that is nearly the same as the upper-half section of the first metal part 23c, has an inner-diameter dimension $d_{24c}$ that is nearly the same as the outer-diameter dimension $D_{23c}$ of the small-diameter section of the first metal part 23c, and has a length in the axial direction that is nearly the same as that of the small-diameter section of the first metal part 23c. The raw material 13d is formed by tightly fitting, with no gaps, the metal material of the second metal part 24c around the outer-circumferential surface of the small-diameter section of the metal material of the first metal part 23c. In this example, the position where the second metal part 24c is located is determined by knowing what portion of the raw material 13d corresponds to a portion of the inner ring 7 that corresponds to the inner-ring raceway 11a, and in this example, for example, this is taken to be where the length in the axial direction of the second metal part 24c is in the range of about 35% to 50%, and preferably 30% to 40% of the length in the axial direction of the raw material 13d, and the thickness in the radial direction of the second metal part 24c is taken to be in the range of 35% to 55%, and preferably 40% to 47% of the radius of the raw material 13d.

In this example, preforming is performed on the raw material 13d, to form a preformed intermediate material 27 such as illustrated in FIG. 4C. Before forming the preformed intermediate material 27, it is possible to perform separate preforming on the raw material 13d and form a preliminary preformed intermediate material 26. The outer diameter of the main hub unit section of the preformed intermediate material 27 is taken to be 50% to 75% of the outer diameter of the raw material 13d, the outer diameter of the flange section is taken to be 150% to 200% of the outer diameter of the raw material 13d, and the thickness in the axial direction of the flange section is taken to be 20% to 30% of the length in the axial direction of the raw material 13d.

Next, as necessary, a finish-formation process, punching process, deburring process and the like are performed to form the preformed intermediate material 27 into a final intermediate material 28 as illustrated in FIG. 4D. The outer diameter of the main hub unit section of the final intermediate material 28 is taken to be 50% to 70% of the outer diameter of the raw material 13d, the outer diameter of the flange section is taken to be 180% to 220% of the outer diameter of the raw material 13d, and the thickness in the axial direction of the flange section is taken to be 10% to 15% of the length in the axial direction of the raw material 13d. Furthermore, by performing a finishing process such as machining and polishing using a lathe, and heat treatment process on each of the parts of the final intermediate material 28, the main hub unit 7 is completed as illustrated in FIG. 4E. In each of the processes of the forging process described above, the second metal part 24c flows in states as indicated by the cross hatching in FIG. 4A to FIG. 4E. In the case of this example, the second metal part 24c is located in the portion near the outside in the radial direction of the lower-half section of the raw material 13d, however, the position of the second metal part 24c is not limited to this location. In other words, it is possible to shift the position of the second metal part 24c in the axial direction, or to provide the second metal part 24c along the entire length in the axial direction. The position of the second metal part 24c can be appropriately set according to the shape of the object member, or the forging processes. The construction, functions and effects of the other parts are the same as in the first example of an embodiment.

Fifth Example

Figure 5:
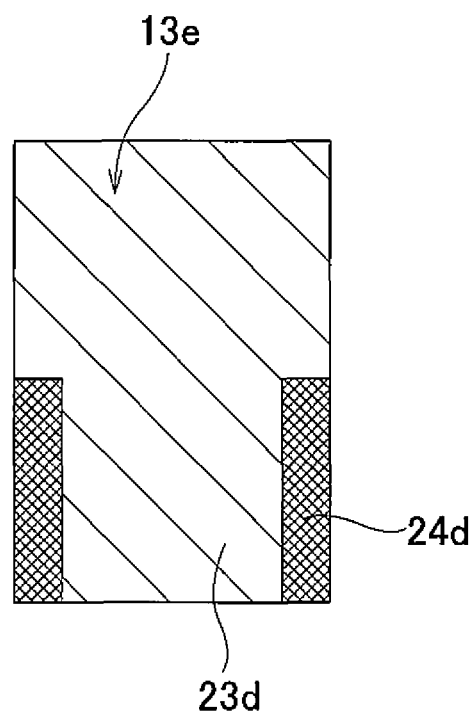
FIG. 5 is a cross-sectional view of the raw material that is used in a fifth example of an embodiment of the present invention.

FIG. 5 illustrates a fifth example of an embodiment of the present invention. In this example as well, as in the fourth example of an embodiment, the object is the main hub unit 7 of a rolling-bearing unit 1 for wheel support (refer to FIG. 14). However, in the case of this example, the raw material 13e is constructed by one kind of a metal such as steel for machine structures, high carbon chromium bearing steel or the like. Then, a second metal part 24d is formed by performing surface heat treatment (modifying treatment) such as carburizing treatment, carbonitriding treatment, induction hardening or the like on the portion that corresponds to the second metal part 24d. The construction, function and effects of the other parts are the same as in the fourth example of an embodiment.

Sixth Example

FIG. 6A to FIG. 6D illustrate a sixth example of an embodiment of the present invention. The object of the manufacturing method for a bearing ring member of this example is the main hub unit 7a of a rolling-bearing unit for wheel support of a drive wheel. Using the raw material 13f that is used in the manufacturing method of this example, it is possible to manufacture various kinds of bearing ring members having a raceway surface formed around the outer-circumferential surface thereof, such as an inner ring 8 as illustrated in FIG. 7 of a rolling-bearing unit for wheel support (refer to FIG. 14), and in addition to this, an inner ring of various kinds of radial rolling bearings, the screw shaft of a ball screw and the like.

Figure 6A:
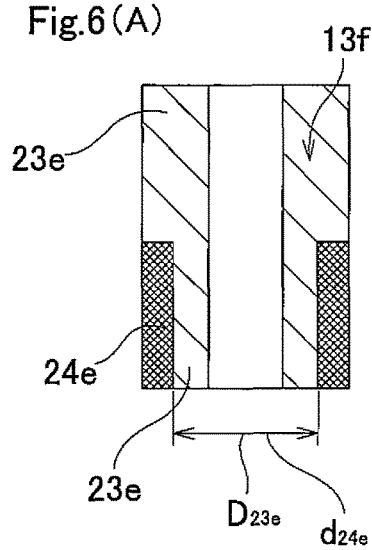
FIG. 6A to FIG. 6D illustrate a sixth example of an embodiment of the present invention with part of the processing steps during forging omitted, and are cross-sectional views from the raw material to the completed hub.
Figure 6B:
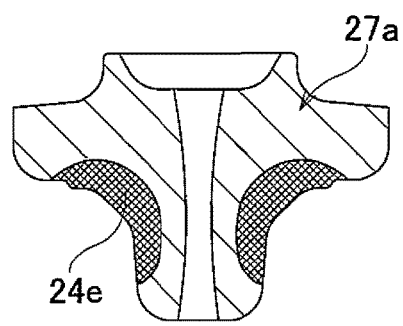
Figure 6C:
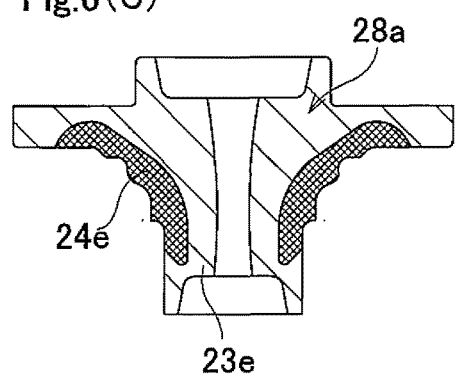
Figure 6D:
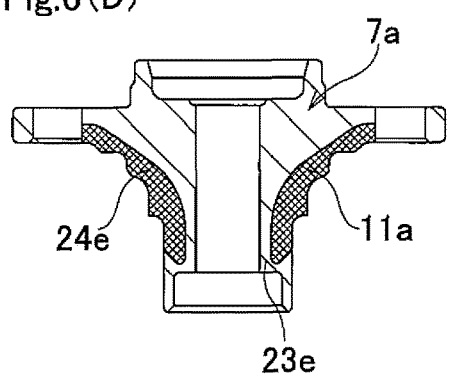
Figure 7:
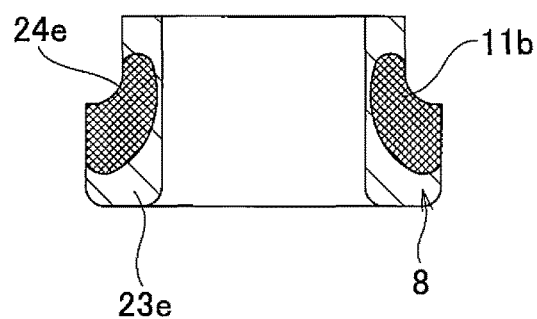
FIG. 7 is a cross-sectional view of a completed inner ring of a sixth example of an embodiment of the present invention.

In this example, a metal cylindrical shaped raw material 13f as illustrated in FIG. 6A is prepared. As in the fourth example of an embodiment of the present invention, the raw material 13f has a second metal part 24e as indicated by the cross hatching in FIG. 6. However, in this example, the object is the main hub unit 7a of a rolling-bearing unit for wheel support of a drive wheel, so the entire raw material 13f is formed into a cylindrical shape. For example, in this example, the inner diameter of the raw material 13f is taken to be 20% to 40%, and preferably 25% to 35% of the diameter of the raw material 13f. The construction, functions, and effects of the other parts are the same as in the fourth example of an embodiment.

Seventh Example

Figure 8:
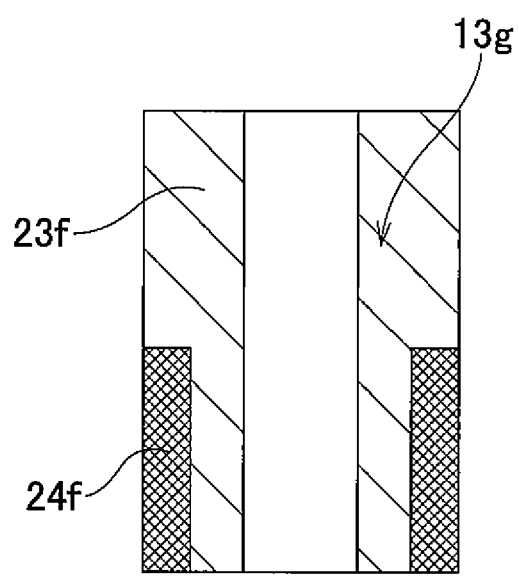
FIG. 8 is a cross-sectional view of the raw material that is used in a seventh example of an embodiment of the present invention.

FIG. 8 illustrates a seventh example of an embodiment of the present invention. In this example, as in the sixth example of an embodiment, the object is the main hub unit 7a of a rolling-bearing unit for wheel support of a drive wheel (refer to FIG. 6). In this example, a metal cylindrical shaped raw material 13g is prepared as shown in FIG. 8. The raw material 13g is constructed by one kind of a metal such as steel for machine structures, high carbon chromium bearing steel or the like. In this example, the inner diameter of the raw material 13g is taken to be 20% to 40%, and preferably 25% to 35% of the diameter of the raw material 13g. Of the raw material 13g, the upper-half section and the cylindrical shaped portion of the inside-half section in the radial direction of the lower-half section is taken to be a first metal part 23f, and of the raw material 13g, the cylindrical portion of the outside-half section in the radial direction of the lower-half section that is indicated by cross hatching in FIG. 8 is taken to be a second metal part 24f. The length in the axial direction of the second metal part 24f is taken to be in the range of 35% to 50%, and preferably in the range 40% to 45% of the length in the axial direction of the raw material 13g, and the thickness in the radial direction of the second metal part 24f is taken to be in the range of 30% to 60%, and preferably in the range 40% to 50% of the overall thickness in the radial direction of the raw material 13g. In the case of this example, the second metal part 24f is formed by performing surface heat treatment (modifying treatment) such as carburizing treatment, carbonitriding treatment, induction hardening or the like on the portion of the raw material 13g that corresponds to the second metal part 24f. The construction, functions and effects of the other parts are the same as in the sixth example of an embodiment.

Eighth Example

Figure 9:
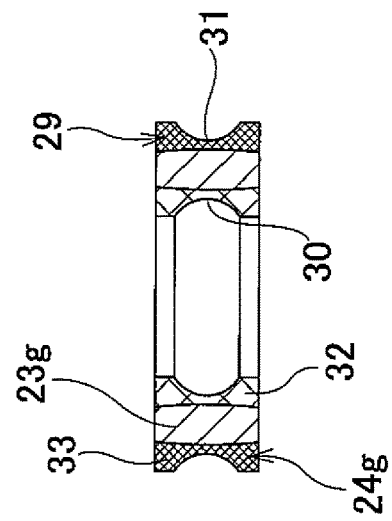
FIG. 9A to FIG. 9C illustrate the processing order of an eighth example of an embodiment of the present invention, and are cross-sectional views from the raw material to the complete middle ring of a triple-ring bearing.
Figure 9:
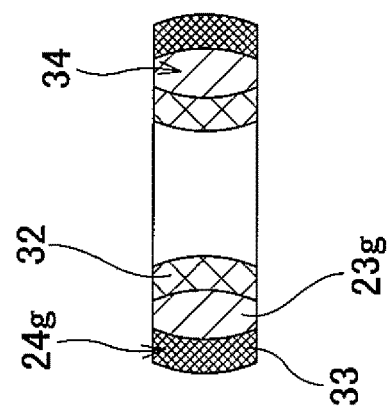
Figure 9:
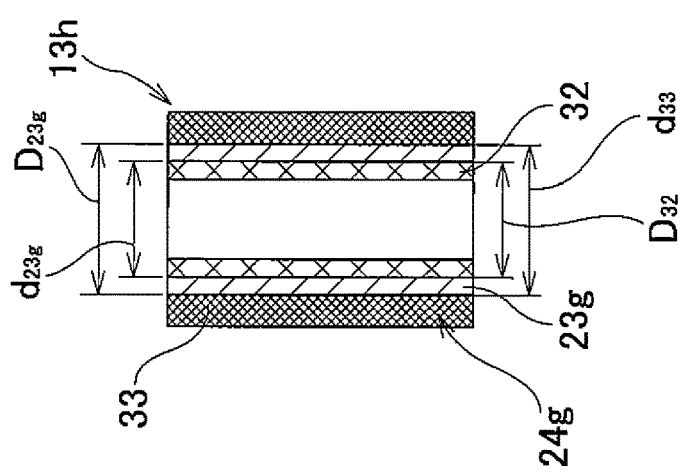

FIG. 9A to FIG. 9C illustrate an eighth example of an embodiment of the present invention. The object of the manufacturing method for a bearing ring member of this example is a cylindrical shaped middle ring 29 that is provided between the cylindrical shaped inner ring and outer ring of a so-called triple ring bearing. The middle ring 29 has a middle-ring-side outer-ring raceway 30 that is formed around the inner-circumferential surface thereof, and a middle-ring-side inner-ring raceway 31 that is formed around the outer-circumferential surface thereof, these raceways 30, 31 respectively corresponding to the raceway surface of the present invention.

In this example, a metal cylindrical shaped raw material 13h is prepared as illustrated in FIG. 9A. The raw material 13h has a first metal part 23g, and a second metal part 24g that is indicated by cross-hatching in FIG. 9A. The first metal part 23g is formed into a cylindrical shape using a metal material such as steel for machine structures. Moreover, the second metal part 24g has a second small-diameter metal part 32 and a second large-diameter metal part 33. The second small-diameter metal part 32 is formed into a cylindrical shape using a metal material such as high carbon chromium bearing steel that has higher fatigue strength and wear resistance when forming a middle-ring-side outer-ring raceway 30 than the first metal part 23g. The outer diameter dimension $D_{32}$ of the cylindrical shaped metal material of the second small-diameter metal part 32 is nearly the same as the inner diameter dimension $d_{23g}$ of the cylindrical shaped metal material of the first metal part 23g. The second large-diameter metal part 33 is formed into a cylindrical shape using a metal material such as high carbon chromium bearing steel that has a higher fatigue strength and wear resistance when forming a middle-ring-side inner-ring raceway 31 than the first metal part 23g. The inner diameter dimension $d_{33}$ of the cylindrical shaped metal material of the second large-diameter metal part 33 is nearly the same as the outer diameter dimension $D_{23g}$ of the cylindrical shaped metal material of the first metal part 23g. The raw material 13h is formed by pressure fitting the metal material of the second small-diameter metal part 32 with the inner-circumferential surface of the metal material of the first metal part 23g, and by tightly fitting, without gaps, the metal material of the second large-diameter metal part 32 around the outer-circumferential surface of the metal material of the first metal part 23g.

In this example, the locations of the first metal part 23g, second small-diameter metal part 32, and second large-diameter metal part 33 are determined by knowing what portions of the raw material 13h correspond to the portions of the middle ring 29 that correspond to the middle-ring-side outer-ring raceway 30 and middle-ring-side inner-ring raceway 31. For example, in this example, the inner diameter of the raw material 13h is taken to be about 25% to 45%, and preferably 33% to 38% of the diameter of the raw material 13h, and the second large-diameter metal part 33 is located in the portion of the raw material 13h near the outside in the radial direction, or in other words, in the portion up to approximately 40% to 60% of the thickness in the radial direction from the outer-circumferential surface of the raw material 13h, or approximately up to ½ of the thickness in the radial direction from the outer-circumferential surface of the raw material 13h. Moreover, the first metal part 23g is located in the portion of the raw material 13h that is about 20% to 40% of the thickness in the radial direction and adjacent to the inner-diameter side of the second large-diameter metal part 33, and preferably in the portion that is approximately ¼ of the thickness in the radial direction of the middle section in the radial direction of the raw material 13g. Furthermore, the second small-diameter metal part 32 is located in the portion that is up to approximately 20% to 40% of the thickness in the radial direction from the inner-circumferential surface of the raw material 13h, and preferably in the portion that is approximately ¼ of the thickness in the radial direction from the inner-circumferential surface of the raw material.

In this example, in an upsetting process, the raw material 13h is formed into a thick disk shaped upset intermediate material 34 as illustrated in FIG. 9B. The length in the axial direction of the thick disk shaped upset intermediate material 34 is about 25% to 40% of the length in the axial direction of the raw material 13h. Next, a finishing process such as machining and polishing are performed on each part of the upset intermediate material 34, and by performing heat treatment, a middle ring 29 such as illustrated in FIG. 9C is completed. In each of the processes of a forging process such as described above, the second metal part 24g (second small-diameter metal part 32 and second large-diameter metal part 33) flows in states such as illustrated by the cross hatching in FIG. 9A to FIG. 9C. In other words, in this example, by performing a forging process on the raw material 13h, the second small-diameter metal part 32 of the second metal part 24g is caused to flow to the middle-ring-side outer-ring raceway 30 of the middle ring 29 and the vicinity thereof, and the second large-diameter metal part 33 is caused to flow to a portion that corresponds to the middle-ring-side inner-ring raceway 31 of the middle ring 29 and the vicinity thereof. The construction, functions and effects of the other parts are the same as in the first example of an embodiment.

Ninth Example

Figure 10:
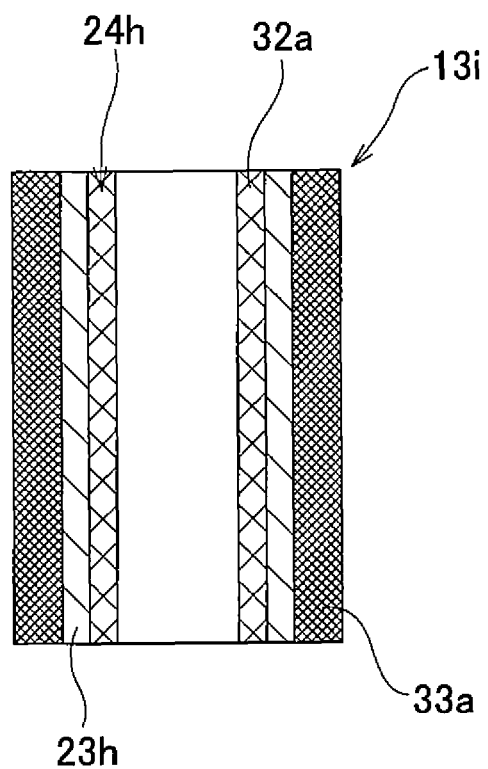
FIG. 10 is a cross-sectional view of the raw material that is used in a ninth example of an embodiment of the present invention.

FIG. 10 illustrates a ninth example of an embodiment of the present invention. The object of the manufacturing method of this example as well, as in the eighth example of an embodiment, is a middle ring 29 of a triple-ring bearing (refer to FIG. 9). In this example, a metal cylindrical shaped raw material 13i is prepared as illustrated in FIG. 10. The raw material 13i is constructed by one kind of metal such as steel for machine structures or high carbon chromium bearing steel. This example differs from the eighth example of an embodiment in that a second small-diameter metal part 32a and second large-diameter metal part 33a are formed by performing surface heat treatment (modifying treatment)

such as carburizing treatment, carbonitriding treatment or the like on portions of the raw material 13*i* that correspond to the second small-diameter metal part 32*a* and second large-diameter metal part 33*a*. The construction, functions and effects of the other parts are the same as in the eighth example of an embodiment.

Tenth Example

Figure 11:
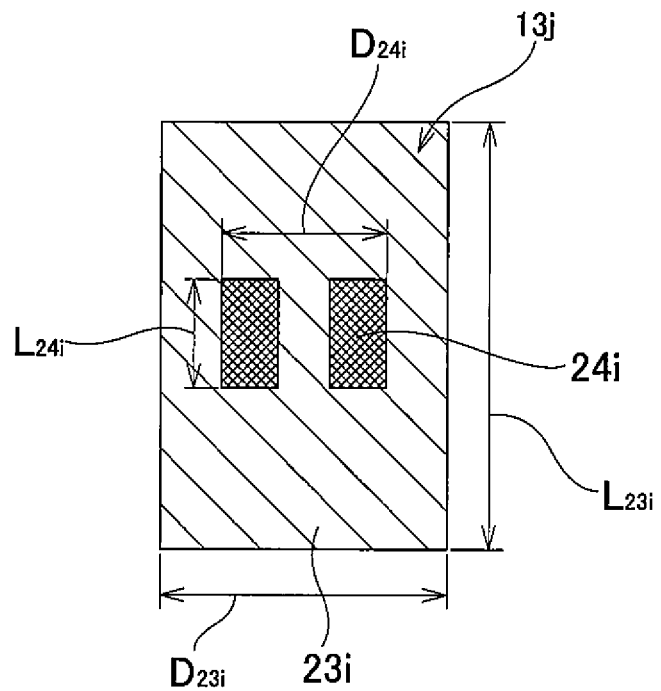
FIG. 11A and FIG. 11B are cross-sectional views of the raw material and final intermediate material of a tenth example of an embodiment of the present invention.
Figure 11:
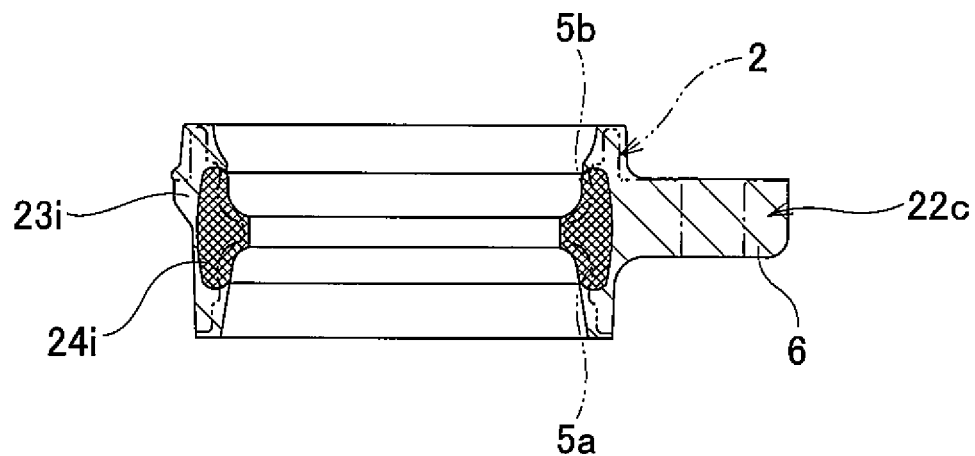

FIG. 11A and FIG. 11B illustrate a tenth example of an embodiment of the present invention. The object of the manufacturing method for a bearing ring member of this example is the outer ring 2 of a rolling-bearing unit for wheel support that is indicated by the two-dot chain line in FIG. 11B. By using the raw material 13*j* that is used in the manufacturing method of this example, it is also possible for various kinds of bearing ring members having a raceway surface that is formed around the inner-circumferential surface thereof such as an outer ring of various kinds of radial rolling bearings, a ball nut of a ball screw and the like to be the object of manufacturing.

In this example, a metal column shaped raw material 13*j* is prepared as illustrated in FIG. 11A. The raw material 13*j* has a first metal part 23*i*, and a second metal part 24*i* that is indicated by cross-hatching in FIG. 11A. The first metal part 23*i* is made using a metal material comprising steel for machine structures, or case hardened steel such as SCM420, and is formed into a column shaft having a hollow cylindrical shape in the inside. The second metal part 24*i* is formed into a cylindrical shape using a metal material comprising high carbon chromium bearing steel 2 (SUJ2) having higher fatigue strength and wear resistance when forming outer-ring raceways 5*a*, 5*b* than the first metal part 23*i*. The outer diameter dimension $D_{24i}$ of the metal material of the second metal part 24*i* is approximately ½ to ⅔ of the outer diameter dimension $D_{23i}$ of the metal material of the first metal part 23*i*. The inner diameter dimension of the metal material of the second metal part 24*i* is approximately ⅙ to ¼ of the outer diameter dimension $D_{23i}$ of the metal material of the first metal part 23*i*. The length dimension $L_{24i}$ in the axial direction of the metal material of the second metal part 24*i* is approximately ¼ to ⅓ of the length dimension L23*i* of the metal material of the first metal part 23*i*. The cylindrical shaped metal material of the second metal part 24*i* is embedded in nearly the center of the metal material of the first metal part 23*i* to form the raw material 23*i*.

The raw material 13*j* is formed so that the cylindrical shaped metal material of the second metal part 24*i* is embedded inside the metal material of the first metal part 23*i* by a forging method such as casting or insertion. The raw material 13*j* passes through an upsetting process, preforming process, finish-formation process, punching process, deburring process and the like and is formed into a final intermediate material 22*c* indicated by the solid lines in FIG. 11B. After that, by performing a finishing process such as machining and polishing using a lathe, and a heat treatment process for each part of the final intermediate member 22*c*, the outer ring 2 as illustrated by the two dot chain lines in FIG. 11B is completed. The construction, functions and effects of the other parts are the same as in the first example of an embodiment.

Eleventh Example

FIG. 12A and FIG. 12B illustrated an eleventh example of an embodiment of the present invention. The object of the manufacturing method for a bearing ring member of this example is a main hub unit 7*a* of a rolling-bearing unit for wheel support of a drive wheel as illustrated by the two-dot chain lines in FIG. 12B. By using the raw material 13*k* that is used in the manufacturing method of this example, it is also possible for various kinds of bearing ring members having a raceway surface that is formed around the outer-circumferential surface thereof such as an inner ring of various kinds of radial rolling bearings, a ball shaft of a ball screw and the like to be the object of manufacturing.

Figure 12:
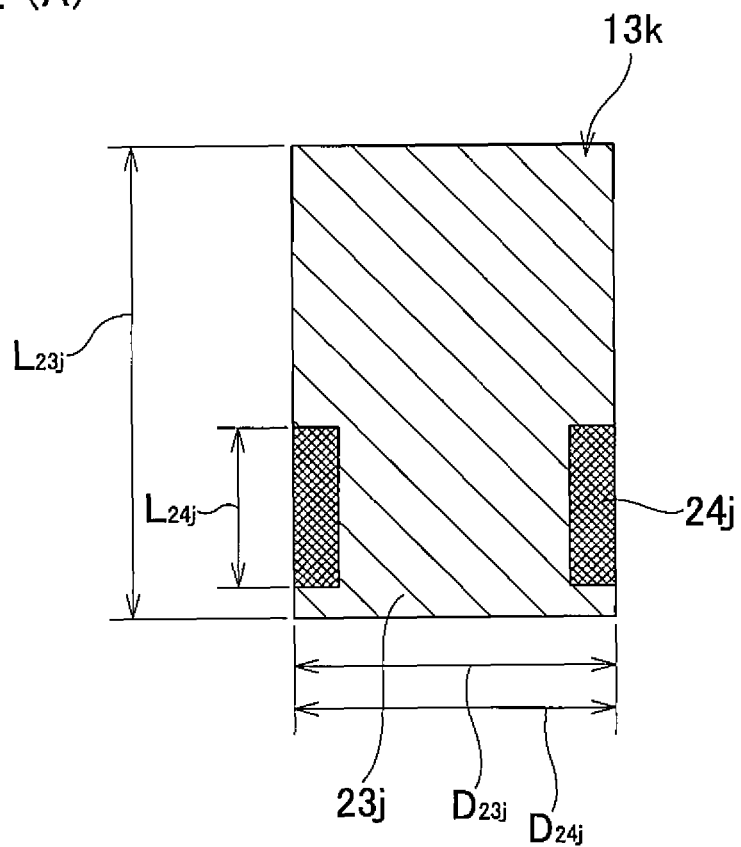
FIG. 12A and FIG. 12B are cross-sectional views of the raw material and final intermediate material of an eleventh example of an embodiment of the present invention.
Figure 12:
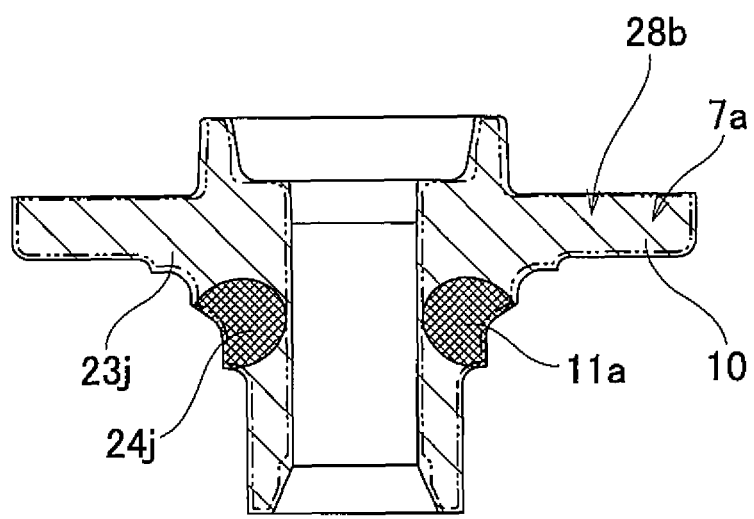

In this example, a metal column shaped raw material 13*k* is prepared as illustrated in FIG. 12A. The raw material 13*k* has a first metal part 23*j*, and a second metal part 24*j* that is indicated by cross-hatching in FIG. 12A. The first metal part 23*j* is made using a metal material comprising steel for machine structures, or case hardened steel such as SCM420, and is formed into a column shape having a small-diameter section in the middle section in the axial direction. The second metal part 24*j* is formed into a cylindrical shape using a metal material such as high carbon chromium bearing steel (SUJ2 to SUJ5) having higher fatigue strength and wear resistance when forming an inner-ring raceway 11*a* than the first metal part 23*j*. The outer diameter dimension $D_{24j}$ of the cylindrical shaped metal material of the second metal part 24*j* is the same as the outer diameter dimension $D_{23j}$ of the large-diameter section of the cylindrical shaped metal material of the first metal part 23*j*. Moreover, the length dimension $L_{24j}$ in the axial direction of the cylindrical metal material of the second metal part 24*j* is approximately ⅓ to ⅖ of the length dimension $L_{23j}$ in the axial direction of the cylindrical shaped metal material of the first metal part 23*j*. The cylindrical shaped metal material of the second metal part 24*j* is provided around the small-diameter section near one end of the middle section in the axial direction (bottom end in FIG. 12) of the metal material of the first metal part 23*j*.

The raw material 13*k* is such that the cylindrical metal material of the second metal part is formed by a forging method to surround the metal material of the first metal part 23*j*. The raw material 13*k* undergoes an upsetting process, preforming process, finish-formation process, deburring process and the like, and is formed into the final intermediate material 28*b* illustrated by the solid lines in FIG. 12B. After that, by performing a finishing process such as machining and polishing using a lathe on each part of the final intermediate material 28*b*, the main hub unit 7*a* such as illustrated by the two-dot chain lines in FIG. 12B is completed. The construction, functions and effects of the other parts are the same as in the fourth example of an embodiment.

Twelfth Example

Figure 13:
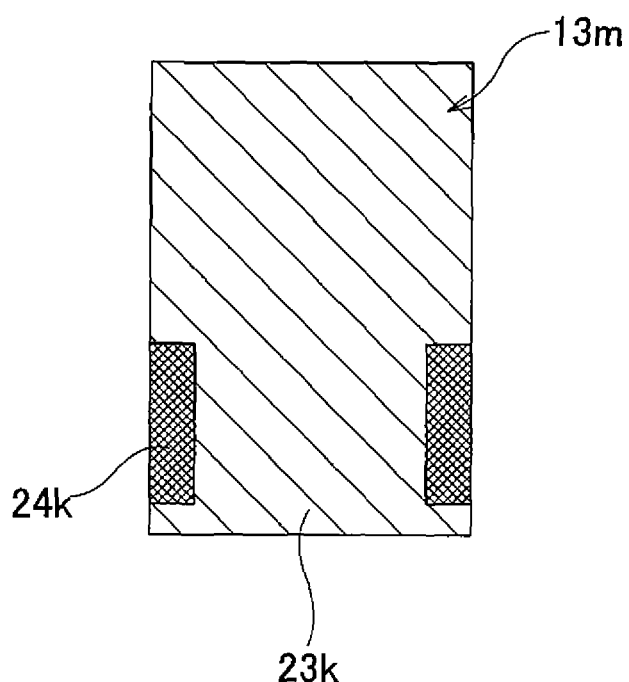
FIG. 13 is a cross-sectional view of the raw material that is used in a twelfth example of an embodiment of the present invention.

FIG. 13 illustrates a twelfth example of an embodiment of the present invention. The object of the manufacturing method of this example as well, as in the eleventh example of an embodiment, is the main hub unit 7*a* (refer to FIG. 12B) of a rolling-bearing unit for wheel support of a drive wheel. In this example as well, a metal column shaped raw material 13*m* as illustrated in FIG. 13 is prepared. However, the raw material 13*m* is formed using one kind of metal such as steel for machine structures, high carbon chromium bearing steel and the like. The cylindrical shaped portion of the raw material 13*m* that is near one end (bottom end in FIG. 13A) of the middle section in the axial direction, and near the outside in the radial direction is taken to be a second metal part 24, and the other portion is taken to be the first metal part 23*k*. In this example, the second metal part 24*k* is formed by performing surface heat treatment (modifying treatment) such as carburizing treatment, carbonitriding treatment or the like on the portion of the raw material 13m that corresponds to the second metal part 24k. The construction, functions and effects of the other parts are the same as in the eleventh embodiment.

INDUSTRIAL APPLICABILITY

The present invention, in addition to the outer ring, main hub unit or inner ring of a rolling-bearing unit for wheel support, can also be applied to various kinds of bearing ring members having raceway surfaces formed all around at least one of the outer-circumferential surface and inner circumferential surface thereof, such as the outer ring and inner ring of various kinds of radial rolling bearings, the ball nut and screw shaft of a ball screw, and the like.

EXPLANATION OF REFERENCE NUMBERS

1 Rolling-bearing unit for wheel support
2 Outer ring
3 Hub
4 Rolling body
5a, 5b Outer-ring raceway
6, 6a Stationary-side flange
7, 7a Main hub unit
8 Inner ring
9 Nut
10 Rotating-side flange
11a, 11b Inner-ring raceway
12 Spline hole
13, 13a to 13k, 13m Raw material
14, 14a Upset intermediate material
15, 15a Preformed intermediate material
16a, 16b Concave section
17 Partition section
18 Cylindrical shaped portion
19, 19a, 19b Finish-formed intermediate material
20 Punched intermediate material
21 Burr
22, 22a, 22b, 22c Final intermediate material
23, 23a to 23k First metal part
24, 24a to 24k Second metal part
25 Partition section
26 Preliminary preformed intermediate material
27, 27a Preformed intermediate material
28, 28a, 28b Final intermediate material
29 Middle ring
30 Middle-ring-side outer-ring raceway
31 Middle-ring-side inner-ring raceway
32, 32a Second small-diameter metal part
33, 33a Second large-diameter metal part
34 Upset intermediate material

What is claimed is:

1. A manufacturing method for a bearing ring member having a raceway surface formed around at least one of an outer-circumferential surface and inner-circumferential surface, the method comprising performing a forging process on a metal raw material, wherein
the metal raw material is configured as a solid columnar member or as a tubular member;
the metal raw material comprises: a first metal part and a second metal part, the second metal part being made of a metal material different from a metal material of the first metal part and press-fitted to a circumferential surface of the first metal part or embedded within the first metal part, or being made of a metal material obtained by use of a modifying process performed on the metal material of the first metal part; and
the second metal part is provided only in an axial portion of the metal raw material which flows to a portion where metal characteristics or processing characteristics of the metal material of the second metal part are required in use of or at processing of the bearing ring member.

2. The manufacturing method for a bearing ring member according to claim 1, wherein
the meta characteristics of the metal material of the second metal part include greater fatigue strength and wear resistance than the metal material of the first metal part, and the portion of the bearing ring member to which the second metal part flows includes the raceway surface and a vicinity of the raceway surface.

3. The manufacturing method for a bearing ring member according to claim 1, wherein
the forging process is performed such that portions of the metal material of the second metal part are sandwiched in an axial direction between portions of the metal material of the first metal part.

4. The manufacturing method for a bearing ring member according to claim 1, wherein
the raceway surface is an outer-ring raceway surface that is formed around the inner circumferential surface of the bearing ring member;
the first metal part has a tubular configuration;
the second metal part has a solid columnar configuration or a tubular configuration; and
the second metal part is provided on an inner surface of the first metal part.

5. The manufacturing method for a bearing ring member according to claim 1, wherein
the raceway surface is an inner-ring raceway that is formed around the outer-circumferential surface of the bearing ring member;
the first metal part has a solid columnar configuration or a tubular configuration;
the second metal part has a tubular configuration; and
the second metal part is provided on an outer surface of the first metal part.

6. The manufacturing method for a bearing ring member according to claim 1, wherein
the bearing ring member has an inner-ring raceway that is formed around the outer-circumferential surface of the bearing ring member, and an outer-ring raceway that is formed around the inner-circumferential surface of the bearing ring member, the inner-ring raceway and outer-ring raceway respectively corresponding to the raceway surface;
the first metal part has a tubular configuration;
the second metal part comprises a relatively small-diameter metal part with a solid columnar configuration or a tubular configuration, and having an outer diameter substantially the same as an inner diameter of the first metal part, and a relatively large-diameter metal part with a tubular configuration and having an inner diameter substantially the same as an outer diameter of the first metal part;
the relatively small-diameter metal part is provided on an inner surface of the first metal part; and
the relatively large-diameter metal part is provided on an outer surface of the first metal part.

7. The manufacturing method for a bearing ring member according to claim 2, wherein the raceway surface is an outer-ring raceway surface that is formed around the inner circumferential surface of the bearing ring member;

the first metal part has a tubular configuration;

the second metal part has a solid columnar configuration or a tubular configuration; and the second metal part is provided on an inner surface of the first metal part.

8. The manufacturing method for a bearing ring member according to claim 2, wherein the raceway surface is an inner-ring raceway that is formed around the outer-circumferential surface of the bearing ring member;

the first metal part has a solid columnar configuration or a tubular configuration;

the second metal part has a tubular configuration; and the second metal part is provided on outer surface of the first metal part.

9. The manufacturing method for a bearing ring member according to claim 2, wherein the bearing ring member has an inner-ring raceway that is formed around the outer-circumferential surface of the bearing ring member, and an outer-ring raceway that is formed around the inner-circumferential surface of the bearing ring member, the inner-ring raceway and outer-ring raceway respectively corresponding to the raceway surface;

the first metal part has a tubular configuration;

the second metal part comprises a relatively small-diameter metal part with a solid columnar configuration or a tubular configuration, and having an outer diameter substantially the same as an inner diameter of the first metal part, and a relatively larger diameter metal part with a tubular configuration and having an inner diameter substantially the same as an outer diameter of the first metal part;

the relatively small-diameter metal part is provided on an inner surface of the first metal part; and the relatively large-diameter metal part is provided on an outer surface of the first metal part.

* * * * *